United States Patent
Youngman et al.

(10) Patent No.: US 6,372,678 B1
(45) Date of Patent: Apr. 16, 2002

(54) PROPPANT COMPOSITION FOR GAS AND OIL WELL FRACTURING

(75) Inventors: Robert Youngman, Phoenix, AZ (US); Patrick R. Okell, Bellaire; Syed Akbar, Pearland, both of TX (US)

(73) Assignee: Fairmount Minerals, LTD, Chardon, OH (US)

( * ) Notice: Subject to any disclaimer, the term of this patent is extended or adjusted under 35 U.S.C. 154(b) by 0 days.

(21) Appl. No.: 09/955,281

(22) Filed: Sep. 18, 2001

Related U.S. Application Data

(60) Provisional application No. 60/236,292, filed on Sep. 28, 2000.

(51) Int. Cl.[7] .............................................. C04B 35/18
(52) U.S. Cl. ...................... 501/128; 501/155; 166/280; 428/407; 428/903.3
(58) Field of Search .................................. 501/128, 155; 166/280; 428/407, 903.3

(56) References Cited

U.S. PATENT DOCUMENTS

| | | |
|---|---|---|
| 3,492,147 A | 1/1970 | Young et al. |
| 3,497,008 A | 2/1970 | Graham et al. |
| 3,642,505 A | 2/1972 | Bakker |
| 3,659,651 A | 5/1972 | Graham |
| 3,890,072 A | 6/1975 | Barks |
| 3,929,191 A | 12/1975 | Graham et al. |
| 4,058,588 A | 11/1977 | Brown et al. |
| 4,068,718 A | 1/1978 | Cooke, Jr. et al. |
| 4,427,068 A | 1/1984 | Fitzgibbon |
| 4,440,866 A | 4/1984 | Lunghofer |
| 4,462,466 A | 7/1984 | Kachnik |
| 4,493,875 A | 1/1985 | Beck et al. |
| 4,518,039 A | 5/1985 | Graham et al. |
| 4,522,731 A | 6/1985 | Lunghofer |
| 4,547,468 A | 10/1985 | Jones et al. |
| 4,548,196 A | 10/1985 | Torobin |
| 4,555,493 A | 11/1985 | Watson et al. |
| 4,585,064 A | 4/1986 | Graham et al. |
| 4,597,991 A | 7/1986 | Graham et al. |
| 4,623,630 A | 11/1986 | Fitzgibbon |
| 4,632,876 A | 12/1986 | Laird et al. |
| 4,639,427 A | 1/1987 | Khaund |
| 4,654,266 A | 3/1987 | Kachnik |
| 4,657,754 A | 4/1987 | Bauer et al. |
| 4,658,899 A | 4/1987 | Fitzgibbon |
| 4,668,645 A | 5/1987 | Khaund |
| 4,671,909 A | 6/1987 | Torobin |
| 4,680,230 A | 7/1987 | Gibb et al. |
| 4,713,203 A | 12/1987 | Andrews |
| 4,717,594 A | 1/1988 | Graham et al. |
| 4,725,390 A | 2/1988 | Laird et al. |
| 4,733,729 A | 3/1988 | Copeland |
| 4,744,831 A | 5/1988 | Beck |
| 4,785,884 A | 11/1988 | Armbruster |
| 4,867,931 A | 9/1989 | Cochran et al. |
| 4,869,960 A | 9/1989 | Gibb et al. |
| 4,879,181 A | 11/1989 | Fitzgibbon |
| 4,894,285 A | 1/1990 | Fitzgibbon |
| 4,921,820 A | 5/1990 | Rumpf et al. |
| 4,921,821 A | 5/1990 | Rumpf et al. |
| 4,938,286 A | 7/1990 | Jennings, Jr. |
| 4,944,905 A | 7/1990 | Gibb et al. |
| 4,977,116 A | 12/1990 | Rumpf et al. |

(List continued on next page.)

FOREIGN PATENT DOCUMENTS

EP    0 101 855 A1    3/1984

*Primary Examiner*—Paul Marcantoni
(74) *Attorney, Agent, or Firm*—Renner, Kenner, Greive, Bobak, Taylor & Weber

(57) ABSTRACT

An aluminosilicate ceramic, spherical pellet made from spent ceramic catalyst. More specifically, a spherical ceramic pellet made from spent fluid cracking catalyst. The pellets can be made by grinding the catalyst particles, forming them into spherical pellets, and then sintering the pellets. The final product is useful as a proppant in oil and gas well fracturing.

30 Claims, 1 Drawing Sheet

U.S. PATENT DOCUMENTS

| | | |
|---|---|---|
| 5,030,603 A | 7/1991 | Rumpf et al. |
| 5,120,455 A | 6/1992 | Lunghofer |
| 5,135,894 A | 8/1992 | Kendall |
| 5,175,133 A | 12/1992 | Smith et al. |
| 5,188,175 A | 2/1993 | Sweet |
| 5,212,143 A | 5/1993 | Torobin |
| 5,225,123 A | 7/1993 | Torobin |
| 5,240,654 A | 8/1993 | Smith et al. |
| RE34,371 E | 9/1993 | Rumpf et al. |
| 5,305,832 A | 4/1994 | Gupta et al. |
| 5,310,002 A | 5/1994 | Blauch et al. |
| 5,321,062 A | 6/1994 | Landrum et al. |
| 5,397,759 A | 3/1995 | Torobin |
| 5,422,183 A | 6/1995 | Sinclair et al. |
| 5,424,285 A | 6/1995 | Stacy et al. |
| 5,425,994 A | 6/1995 | Harry et al. |
| 5,501,275 A | 3/1996 | Card et al. |
| 5,558,822 A | 9/1996 | Gitman et al. |
| 5,582,249 A | 12/1996 | Caveny et al. |
| 5,582,250 A | 12/1996 | Constien |
| 5,597,784 A | 1/1997 | Sinclair et al. |
| 5,639,806 A | 6/1997 | Johnson et al. |
| 5,775,425 A | 7/1998 | Weaver et al. |
| 5,782,300 A | 7/1998 | James et al. |
| 5,787,986 A | 8/1998 | Weaver et al. |
| 5,833,361 A | 11/1998 | Funk |

PROPPANT COMPOSITION FOR GAS AND OIL WELL FRACTURING

CROSS REFERENCE TO RELATED APPLICATIONS

This application claims the benefit of the filing date of the U.S. Provisional Application for Pat. Ser. No. 60/236,292, filed Sep. 28, 2000.

FIELD OF THE INVENTION

The present invention relates to proppant pellets prepared by using alumina-silica containing waste materials from industrial processes. The proppant pellets may be resin coated. The present invention further relates to a method for the manufacture of proppant pellets.

BACKGROUND OF THE INVENTION

In the completion and operation of oil wells, gas wells, water wells, and similar boreholes, it frequently is desirable to alter the producing characteristics of the formation by treating the well. Many such treatments involve the use of particulate material. For example, in hydraulic fracturing, particles called proppants are used to maintain the fracture in a propped condition. In hydraulic fracturing, proppant particles under high closure stress tend to fragment and disintegrate. At closure stresses above about 5,000 psi, silica sand, the most common proppant, is not normally employed due to its propensity to disintegrate. The resulting fines from this disintegration migrate and plug the interstitial flow passages in the propped interval. These migratory fines drastically reduce the permeability of the propped fracture. Since closure stress varies directly with depth, this means that sand is not a useful proppant material at depths greater than about 5,000 feet.

Sintered bauxite or high grade alumina have been used as proppant materials at well depths greater than 20,000 feet, but these high strength proppants have much higher densities than sand and therefore require high viscosity pumping fluids or high pumping rates. Larger pumping equipment is required, and wear rates on fluid carrying equipment is accelerated. In addition, the raw materials used to make the proppant materials are more costly.

Proppants of intermediate density are known, and work well in the intermediate depths and pressures, i.e., 7,000 to 14,000 feet (5,000–10,000 psi).

Proppant pellets having a specific gravity of less than 3.4 g/cm$^3$ have been made from diaspore clay, bauxite, and/or alumina. Eufala bauxite, a bauxitic-kaolin material, has been used to prepare a proppant with a density of less than 3.0 g/cm$^3$. Also known is a method of making ceramic microspheres for use as proppants from water-soluble salts, mineral compositions or organometallic complexes, and ultrafine bauxite or alumina-containing particles. A low density proppant has been prepared from kaolin clay and amorphous to microcrystalline silica. The raw materials used to make all these intermediate proppants are costly, and a less expensive proppant material is desired.

Resin coated particles have been used in efforts to improve the stability of proppants at high closure stresses. Sand or other substrates have been coated with an infusible resin such as an epoxy or phenolic resin. These materials are superior to sand at intermediate stress levels. However, at high temperature and high stress levels, the resin coated particles still show a decrease in permeability.

A process is known for coating particulates with an infusible resin for use as proppants in fracturing operations. The particulates include sand, nut shells, glass beads and aluminum pellets. The resins include urea-aldehyde resins, phenol-aldehyde resins, epoxy resins, furfuryl alcohol resins and polyester or alkyd resins. The resin coating may be applied by mixing the particles with a melted resin and subsequently cooling the mixture, or dissolving the resin in a solvent, applying it to the particles, and evaporating the solvent. Coupling agents may be added to the system to improve the strength of the resin-substrate bond.

Proppants comprising sand particles with a precured phenol formaldehyde resin coating have been used for propping fractures in subterranean formations.

Although resin coated sands have proven satisfactory in numerous applications, concern exists over their use under high closure stresses. For example, some self consolidating resin coated particles of the prior art do not develop their full strength until the resin coating has cured in the formation. In the event of rapid closure of the fracture, the proppant could be crushed before the resin cured, resulting in decreased permeability. This problem is alleviated by the use of a dual resin coated particle having a reinforcing agent interspersed at the inner resin/outer resin boundary, as described in U.S. Pat. No. 5,422,183 assigned to Santrol, Inc, incorporated herein by reference as if fully written out below.

SUMMARY OF THE INVENTION

The present invention utilizes spent ceramic media from petroleum refining operations, where the media provides a catalytic function during "cracking" of the hydrocarbons, while drawing out impurities from the crude oil as it passes through a packed column of ceramic beads. These beads are manufactured by Englehard Corporation, W R Grace and Akzo Nobel as well as other Far Eastern producers and are variously known as fluid cracking catalyst, e-cats, and equilibrium catalyst (hereinafter referred to as "fluid cracking catalyst" or "FCC"). The use of catalytic ceramic media for removing impurities from petroleum products is a long established art. The catalytic media can be regenerated after use as a cracking catalyst several times but eventually is spent, and is discarded as waste material. The present invention uses the FCC as a base material for remanufacturing larger ceramic spheres, which can be used in the hydraulic fracturing of subterranean oil and gas bearing formations.

The present invention provides a spherical ceramic proppant pellet comprising spent fluid cracking catalyst particles, wherein the pellet is formed by reducing the median particle size of the catalyst; mixing the catalyst particles with water and a binder to form spherical pellets; and sintering the pellets.

The present invention also provides a method for preparing a spherical ceramic proppant pellet, the method comprising the steps of providing spent fluid cracking catalyst particles; reducing the particle size of the catalyst particles; mixing the catalyst particles with water and a binder to form spherical pellets; and sintering the pellets.

The present invention further provides a proppant composition comprising spent fluid cracking catalyst, wherein the spent fluid cracking catalyst comprises from about 25 to about 80 weight percent synthetic silica, and from about 20 to about 75 weight percent alumina. The spent fluid cracking catalyst may optionally further comprise at least one of:

up to about 1,000 parts per million copper;

up to about 7,000 parts per million vanadium;

up to about 200 parts per million lead;

up to about 7000 parts per million nickel;

up to about 2500 parts per million antimony;

up to about 2 weight percent iron;

up to about 1.5 weight percent sodium; and, detectable amounts of a least one component selected from the group consisting of platinum, rhenium, sulfur compounds, and rare earth metals.

DETAILED DESCRIPTION OF THE INVENTION

Figure 1:
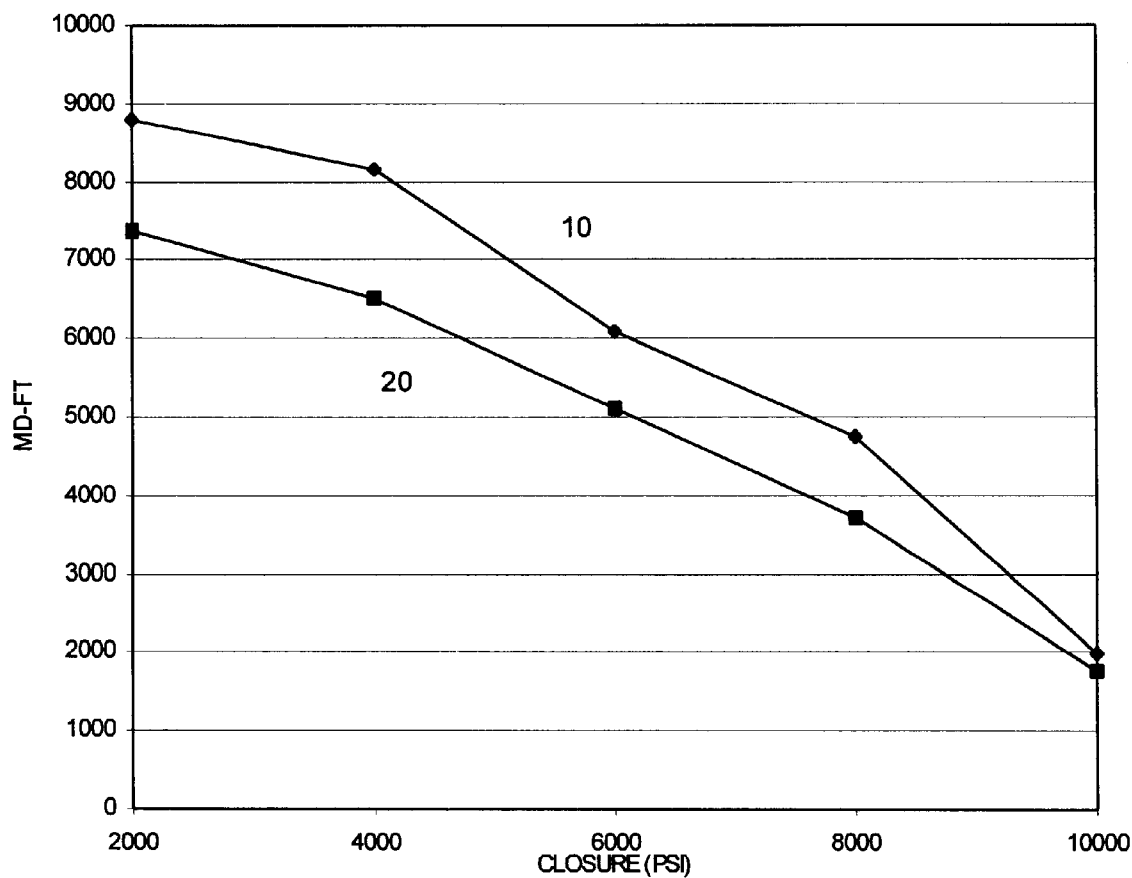
FIG. 1 is a graphical representation of the conductivity of an FCC ceramic proppant and a commercial lightweight ceramic proppant at various closure pressures.

The present invention utilizes fluid cracking catalyst, a material rich in alumina and silica, as a ceramic feedstock for producing proppant pellets. The catalyst material is formed into pellets and sintered using conventional methods.

Spent fluid cracking catalysts exist as ceramic beads comprising calcined mixtures of silica (SiO2), alumina (Al2O3), with minor amounts of antimony, copper, nickel, vanadium, lead, rare earth metals, sulfates, sulfides, and trace amounts of other components. Although the exact compositions of commercial FCCs are proprietary, in general a fluid cracking catalyst has four major component systems: zeolite, matrix, binder, and filler.

Zeolite, sometimes called molecular sieve, has a well-defined lattice structure. Its basic building blocks are silica and alumina tetrahedra. Typical zeolites also contain counterions such as sodium, and ammonium ions. Zeolites employed in the manufacture of the FCC catalyst are synthetic versions of naturally occurring zeolites called faujasites. Zeolites with applications to FCC are Type X, Type Y, and ZSM-5. Both X and Y zeolites have essentially the same crystalline structure. The major difference is that the X zeolite has a lower silica/alumina ratio than the Y zeolite. Virtually all of today's catalysts contain Y zeolite or variations thereof. One variation is an aluminum-deficient zeolite, called ultrastable Y, or simply USY. Zeolites are sometimes ion exchanged with rare earth components in order to increase catalytic activity and thermal stability. Rare earth is a generic name for fourteen metallic elements of the lanthanide series, including lanthanum and cerium.

The matrix component of the FCC can also have catalytic activity. Alumina is normally the source for the matrix component. Most FCCs contain an amorphous alumina matrix, but some catalyst suppliers incorporate a form of alumina that has a crystalline structure.

The filler component is a clay incorporated into the catalyst to dilute its activity. Kaolin $[Al_2(OH)_2,Si_2O_5]$ is the most common clay used in the FCC catalyst. One FCC catalyst manufacturer used kaoline clay as a skeleton to grow the zeolite in situ.

The binder serves as a "glue" to hold the zeolite, matrix and filler together. The functions of the filler and the binder are to provide physical integrity and mechanical strength. They impact such characteristics of the FCC as density, attrition resistance, and particle size distribution.

Spent fluid cracking catalyst also contains a number of metal contaminants, including nickel, vanadium, iron, antimony and copper. These contaminants originate largely from the heavy, high-molecular weight fraction of the FCC feed. The quantity of these metals on the FCC is determined by their levels in the petroleum feedstock and the catalyst addition rate. Essentially, all these metals in the feed are deposited on the catalyst. Much of the iron on the FCC comes from metal scale from piping.

Another component of spent fluid cracking catalyst is coke, which is carbon that is deposited on the catalyst during cracking.

As metal and carbon contaminants are deposited on the FCC, the catalyst loses its activity and selectivity. Fresh catalyst is added to the reactor unit continually to replace the catalyst lost by attrition and to maintain catalyst activity. In cases where the makeup rate for activity maintenance exceeds catalyst losses, part of the catalyst inventory is periodically withdrawn from the unit to control the catalyst level in the regenerator. This spent catalyst provides a low cost feedstock that is rich in alumina and silica, and according to the invention is remanufactured to produce larger ceramic spheres. The ceramic spheres can be used as proppants in the hydraulic fracturing of subterranean oil and gas bearing formations.

Spent fluid cracking catalysts suitable for the proppant of the present invention therefore primarily contain silica and alumina, and may further contain sodium or other counterions, rare earth elements, carbon, metals such as typically found in petroleum feedstocks, and other contaminants.

The ratio of silica to alumina is a critical factor in the ultimate performance of the proppant product, but can be quite variable in fluid cracking catalysts. A nominal 45/55 silica to alumina weight ratio is quite common in FCCs. Preferred useful ratios by weight of silica to alumina for use as a feedstock material for proppants according to the present invention are about 2:1 to more preferably about 1:1. Spent fluid cracking catalyst suitable for use as a feedstock material comprise 25–80 weight percent silica, preferably 40 to 60, weight percent silica, and even more preferably 45 to 55 weight percent silica. Suitable fluid cracking catalyst for use according to the present invention comprise 20–75 weight percent alumina, preferably 30 to 60 weight percent alumina, and even more preferably 45 to 55 weight percent alumina. Typical ranges of chemical compositions for MET 192 or MET 195 from Metalloy Corporation are shown in Table A.

TABLE A

| Chemical Name | Wt Percent |
| --- | --- |
| Silica (synthetic), $SiO_2$ | 25–80 |
| Alumina $Al_2O_3$ | 20–75 |
| Quartz ($SiO_2$) | <1.0 |
| Antimony | 0–2500 ppm |
| Copper | 5–1000 ppm |
| Vanadium | 45–7000 ppm |
| Lead | 200 ppm |

This chemical analysis is included for example purposes only, and should not be considered as a limitation of the FCC used to produce the proppants of the present invention. In some instances, alumina or silica can be added, such as clay or silica gel, to adjust the silica:alumina weight ratio to 1:1 to 2:1.

The spherical ceramic proppant pellets of the present invention are prepared by a method comprising the steps of providing spent fluid cracking catalyst particles, reducing the particle size of the catalyst particles, mixing the catalyst particles with water and a binder to form spherical pellets, and sintering the pellets. The pellets are preferably screened to provide a suitable median particle size.

Reduction of the particle size of the FCC particles is preferably accomplished by conventional ball milling techniques, including either wet or dry ball milling. The median particle size of the FCC particles after reduction is preferably about 1 to about 10 microns, and more preferably about 2 to about 6 microns, as measured by laser diffraction.

The comminuted FCC particles are then mixed with water and a binder. Suitable binders include, but are not limited to, polyvinyl acetate, methyl cellulose, and polymethylmethacrylate. The amount of water used is preferably 25–45 percent by weight of fluid cracking catalyst, but will vary depending on the composition of the FCC. The amount of binder used is preferably about 0.1% to 0.5% by weight, preferably about 0.2 to 0.25%, but will depend on particle size distribution and shape.

Mixing may be accomplished by conventional methods. Preferably, a Eirich mixer is used, such as an Eirich RVO2. The pellet size is determined by mixer run time. A mix time of 45 seconds to 80 seconds is usually sufficient in the particular equipment used to form well rounded substantially spherical pellets in the size range of 1 mm to 420 microns. After spherical pellets form, the pellets are dried at relatively low temperatures of from about 120 to about 150° C. After drying, the pellets are sufficiently tough to undergo the stress of pneumatic handling and sintering.

Sintering is preferably accomplished using a rotary kiln, although other conventional sintering methods may be used. Pellets are sintered at a temperature of about 1,300° C. to about 1,500° C. The temperature along the kiln will vary but most preferably a temperature of about 1,500° C. is attained for a dwell time of at least about 30 minutes. Sintering causes a reduction of up to 20% in particle size as well as an increase in density in the component products. A finished proppant particle according to the process described above may have a density in the range of about 2 to about 2.7 gm/cm$^3$, depending upon the source FCC and actual sintering temperature. Preferably, the density of the finished proppant particle is from about 2.45 gm/cm$^3$ to about 2.65 gm/cm$^3$.

After sintering the pellets assume a darker gray color and can be screened by Rotex or other conventional methods into the particle sizes needed. A typical product size is 20/40 mesh, which indicates that 90 weight percent of its pellets are between 0.0167 inches and 0.0331 inches in size. Preferably, 90 weight percent of the pellets are between 0.0232 inches and 0.0331 inches in size.

EXAMPLE 1

Spent FCC particles were ball milled to a 4–6 micron median particle size, as measured by laser diffraction. Ten pounds of milled material having a dried, free flowing form was fed to a pellet forming mixer device, specifically an Eirich RVO2. To the test batch, 25% to 45% by weight of water and liquid polyvinyl acetate (PVA) was added in the amount of 0.3% by liquid volume. The addition of PVA added green strength for subsequent sintering.

When spherical pellets formed in the mixer, the machine was stopped and the pellets were transferred to a low temperature convection oven and dried at 120° F. for 1 hour. The specific gravity of the product at this stage was approximately 2.1 gm/cm$^3$.

After drying, the spherical pellets were sintered in a rotary kiln at a temperature of between 1,325° C. to 1,500° C. for about 30 minutes. After sintering, the pellets were screened to 20/40 mesh.

The pellets so formed are surprisingly similar in performance to existing ceramic proppant pellets, albeit with slightly lower crush resistance and lower conductivity with respect to brine and hydrocarbons, as shown in FIG. 1.

Conductivity Data

Conductivity testing to determine the relative conductivity of the final FCC pellets was followed according to standard StimLab procedures using 2% KCl as the flowing medium. As shown in Table 1, the data indicate that the FCC product, although slightly lower in absolute conductivity, is within 10% of the performance of a typical lightweight ceramic at higher closures (10,000 psi). This is graphically represented in FIG. 1, where line 10 shows the performance of commercial lightweight ceramic proppant, and line 20 show the performance of the FCC ceramic proppant.

TABLE 1

Conductivity of 20/40 FCC Ceramic Proppant
vs.
Commercial 20/40 Lightweight Ceramic Proppant
2 lb./sq. ft., 250° F., 50 hours @ closure, 2% KCl solution.

| Closure (psi) | Conductivity (md-ft) Lightweight Ceramic Proppant | Conductivity (md-ft) FCC Ceramic Proppant |
| --- | --- | --- |
| 1000 | 10518 | 10278 |
| 2000 | 8800 | 7365 |
| 4000 | 8157 | 6500 |
| 6000 | 6100 | 5100 |
| 8000 | 4738 | 3719 |
| 10000 | 1973 | 1770 |

Crush Data

Crush numbers were generated at 7,500 psi, according to standard API RP 60 procedures. Crush data, shown in Table 2, indicate a slight decline in crush strength over current lightweight ceramics, but the proppants prepared according to the present invention have performance approximating existing commercial proppant products, and are suitable for commercial use.

TABLE 2

| 20/40 Proppant Material | % Crush at 7500 psi |
| --- | --- |
| FCC Ceramic Proppants | 9.1 |
| Commercial Lightweight Ceramic Proppants | 6.8 |

It is expected that crush resistance and conductivity of the proppant products prepared according to the present invention, will equal or exceed that of commercial lightweight ceramic proppants, with manufacturing scaleup.

Roundness and Sphericity

The Krumbein roundness and sphericity of the FCC derived ceramic proppants are approximately 0.9 and are equivalent to commercial lightweight ceramic proppants.

Additional proppant pellets were prepared from spent FCC catalyst according to the above described procedure, with 24 hour wet milling in a ball mill, drying and pressing into pellets. Sintering was conducted at 1300° C., 1400° C. or 1500° C. for 10 minutes. A final density of 99.6% of theoretical was achieved. X-ray diffraction indicated that the pellets contained about 50 to about 60 mol % cristobalite and about 40 to about 50 mol % mullite.

Other proppant pellets prepared according to the process of the present invention were tested for conductivity as described above, and the results of the tests are reported in Table 3, below.

TABLE 3

| Closure (psi) | Conductivity (md-ft) |
|---|---|
| 1000 | 8750–10278 |
| 2000 | 6500–7365 |
| 4000 | 5500–6500 |
| 6000 | 4800–5100 |
| 8000 | 3500–3719 |
| 10000 | 1650–1770 |

Advantageously, proppant pellets comprising spent fluid cracking catalyst utilize waste materials from the petroleum refining process which would otherwise be costly to dispose of or reclaim. The proppant pellets of the present invention are lightweight, low density materials with crush strength and conductivity approximating those of existing products.

The utility of the FCC ceramic proppant of the present invention can be extended into high stress applications by coating the proppant with a resin coating. The resin coating may be cured or curable. In one embodiment, the FCC ceramic proppant pellets are coated with a resin dissolved in a solvent which is then evaporated. The resin is then cured. In another embodiment, the FCC ceramic proppant pellets are mixed with a melted resin which is then cooled, coating the pellets. The resin coating is then cured. Alternately, the resin coating is curable, but not substantially cured prior to use. In this embodiment, the resin is cured after injection into the well formation by techniques known in the art.

In a preferred embodiment, FCC ceramic proppant pellets are covered with an inner coating of a fusible, curable resin and an outer coating of a substantially cured resin. The resin coated particle can be used as a self-consolidating proppant, and is compatible with the fracturing fluid. If desired, the proppant pellet may further comprise an additional coating of a substantially cured resin which is located on the exterior of the substrate and inside the inner coating. Such particles exhibit enhanced properties such as improved fractionating fluid compatibility.

Resins suitable for the inner and outer coatings are generally any resins capable of being coated on the substrate and then being cured to a higher degree of polymerization. Examples of such resins include phenol-aldehyde resins of both the resole and novolac type, urea-aldehyde resins, melamine-aldehyde resins, epoxy resins and furfuryl alcohol resins and copolymers of such resins. The resins must form a solid non-tacky coating at ambient temperatures. This is required so that the coated particles remain free flowing and so that they do not agglomerate under normal storage conditions.

The preferred resins are the phenol-formaldehyde resins. These resins include true thermosetting phenolic resins of the resole type and phenolic novolac resins that may be rendered heat reactive by the addition of catalyst and formaldehyde. Such resins with softening points of 185° F. to 290° F. are acceptable.

The inner and outer coatings can be formed starting with the same or different type of resins. For example, the inner coating could be produced from a novolac and the outer coat from a resole. Regardless of the type of resin used, the outer resin must be curable at conditions that leave the inner coating curable, i.e., fusible and heat reactive.

A coupling agent as subsequently described is preferably incorporated during manufacture into the resin that is to be used as the inner coating, and may optionally also be incorporated into the resin that is to be used as the outer coating. The coupling agent which has a functional group reactive in the resin system is added in an amount ranging from about 0.1 to 10% by weight of the resin. The preferred range is from about 0.1 to 3% by weight of the resin. When using the preferred phenol formaldehyde resins, the coupling agent is incorporated into the resin under the normal reaction conditions used for the formation of the phenol-formaldehyde resin. The coupling agent is added to the resin after the phenol formaldehyde condensation reaction has occurred and the resin has been dehydrated to the final free phenol and melt viscosity range.

A preferred resin of the inner coating is a phenolic novolac resin. Particularly suitable are phenolic novolac resins manufactured by Georgia Pacific, known as 99NO7, and by OxyChem, known as 24-715. The GP-099N07 resin has a softening point range of 85° F.–100° F. The OxyChem 24-715 exhibits a softening point range of 70° F.–87° F. When either resin is used, it is necessary to add to the mixture a cross-linking agent to effect the subsequent curing of the resin. Hexamethylenetetramine is the preferred material for this function as it serves as both a catalyst and a source of formaldehyde.

The coupling agent to be employed is chosen based on the resin to be used. For phenolic resins, the coupling agents include amino, epoxy, and ureido organo silanes. Epoxy modified gamma-glycidoxypropyltrimethoxysilane has given excellent results when used in the amount of 0.50–1.00% based on the weight of the resin. The use of coupling agents as incorporated into the resin and as applied directly to the particulate substrate is discussed in Graham et al, U.S. Pat. No. 4,518,039, incorporated herein by reference as if fully written out below.

The outer coating of resin is formed from a heat curable resin coating formed over the inner resin. As stated previously, this outer resin must be curable at conditions that do not completely cure the inner coating thus leaving the inner coating curable. The preferred resins for the outer coating are of the resole type. Particularly suitable is a fast curing resole resin manufactured by Georgia Pacific known as 102N68. Resole resins generally are provided dissolved in a methanol and water solution as is Georgia Pacific 102N68. The resin exhibits an extremely fast cure having a 150° C. hot plate cure time of 30 seconds or less. The preferred resole should be in a solution of water and methanol as the solvent system. The organic solids level should be 65–75%, with a water content in the 5–15% level. The hot plate cure time at 150° C. should be in the range of 25–40 seconds.

The inner and outer resin coatings may be formed by a variety of methods. For example, the solvent coating process described in U.S. Pat. No. 3,929,191, to Graham et al., incorporated herein by reference as if fully written out below.

Other processes such as that described in U.S. Pat. No. 3,492,147 to Young et al. describes the coating of a particulate substrate with a liquid, uncatalyzed resin composition characterized by its ability to extract a catalyst or curing agent from a non-aqueous solution. As stated above, the preferred resins for use with the instant invention are phenol-formaldehyde novolac resins. When using such resins the preferred coating method is a hot melt coating procedure for forming the inner coat. Such a procedure is described in U.S. Pat. No. 4,585,064, to Graham et al, incorporated herein by reference as if fully written out below. Solvents are preferably used to apply the outer coat. The following is a discussion of typical coating process parameters using the preferred phenol-formaldehyde novolac resins.

The improved high strength particles of this embodiment of the invention are coated in a multi-step process. In the first step a phenol-formaldehyde resin inner coat is formed over the particulate substrate. In the second step an outer coating is formed. The outer coating is then cured at conditions that leave the inner resin curable.

The first or inner coating of resin may be formed on the particulate substrate by first coating the heated substrate with a phenol-formaldehyde novolac resin. This coating is carried out by preheating the particulate substrate to a temperature above the melting point of the particular resin used.

Typically the particulate substrate is heated to 350° F. to 500° F. prior to resin addition. The heated substrate is charged to a mixer or muller where generally from about 1% to about 6%, by weight of substrate, resin is added. The preferred amount of resin based on the weight of substrate is about 2%.

After completion of addition of the resin to the substrate, the substrate and melted resin are allowed to mix in the muller for a time sufficient to insure the formation of a uniform coating of resin on the particulate, usually about 10 to about 30 seconds.

Following this mixing step from about 5 to about 25%, by weight of the resin, of hexamethylenetetramine is added to the substrate resin mixture. The preferred amount of hexamethylenetetramine is about 13% by weight of the resin. After addition of the hexamethylenetetramine the entire mixture is allowed to mull for approximately one minute. Then water is added to quench the reaction of the inner resin coating. The amount of water added and the timing of its addition is adjusted to quench the curing of the inner resin while maintaining sufficient heat in the proppant to cure the outer coating that is added next.

The outer resin is then coated over the inner resin and allowed to substantially cure. Substantially cured, as used herein, is to be interpreted as meaning that the cross-linking reaction of the resin is substantially complete and that at typical downhole temperatures only minimal additional curing takes place. When the outer coating is the preferred resole, its addition is preferably carried out by adding it as a solution in a water/methanol mixture comprising between 15–30% methanol and 5–15% water. The preferred mixture is 6% water and 25% methanol.

As can be appreciated, it is useful in preparing the coated proppant of the present embodiment of the invention to precisely control the heat and mass balance to ensure that a cured outer coating encapsulates a still curable inner resin coating. One skilled in the art will recognize that batch size, equipment used, and resins selected will affect process conditions. Initial process temperature, process intervals, amounts of quench water added and amounts of solvent are all interrelated and may be manipulated to arrive at an optimal process. Although experimentation may be required, optimization is within the level of skill in the art.

In yet another preferred embodiment, the FCC ceramic proppant pellet is coated with a substantially cured inner resin coating and an outer resin coating which may be heat curable, fully cured, or of intermediate nature. A reinforcing agent may be interspersed at the inner resin coating/outer resin coating boundary. Suitable resins include those described above in the previous embodiment.

A key to the increased strength of the resin coated particles of this embodiment is the addition of a reinforcing agent in the boundary region between the inner and outer resin coatings. The reinforcing agents are preferably added after coating the particle with the inner resin coating but before the inner coating is cured.

Suitable reinforcing agents include materials known to act as reinforcing agents in typical engineering resins and composite materials. Common to all suitable reinforcing agents is the requirement that they be of a particle size calculated to give the required properties. For example, various mineral fillers including fumed silicas, silica four, talc, clays, mica, asbestos, calcium carbonate, calcium sulfate, metals and wollastanite are suitable. The size of such reinforcing agents is typically less than 300 mesh. Reinforcing materials of a fibrous or rod like nature should be less than about 0.006 inches and preferably about 0.002 inches in length. Of these, silica flour ground to about 325 mesh is preferred.

Another type of reinforcing agent with utility in the present invention are impact modifiers used in engineering resins and composite materials. Examples of such materials include polyisobutylene, ethylene-vinyl acetate copolymers, ethylene-propylene copolymers and other rubbery materials. Also suitable are the so-called core shell impact modifiers having a rubbery core with a graft polymerized crystalline shell. To obtain the proper particle size cryogenic grinding of the rubbery materials is useful.

In accordance with the method of the present invention, the coated or uncoated free flowing FCC ceramic proppant pellet particles produced as described above may be used as proppants, gravel or fluid loss agents in hydraulic fracturing, frac packing and gravel packs. The application will determine the choice of whether the proppant pellet is resin coated or not, and whether the coatings are cured or curable. For example, a curable coating may be indicated for gravel packing, while in fracturing a substantially cured outer coating may be preferred to prevent interaction with the frac fluid.

In carrying out a hydraulic fracturing operation, a fracture is first generated by injecting a viscous fluid into the formation at a sufficient rate and pressure to cause the formation to fail in tension. The fracturing fluid may be an oil base, water base, acid, emulsion, foam or other fluid. The fracturing fluid may contain several additives such as viscosity builders, drag reducers, fluid loss additives, corrosion inhibitors, cross linkers and the like, known in the art. Injection of the fluid is typically continued until a fracture of the desired geometry is obtained. Preferably the fracture at the well bore is at least 2.5 times the diameter of the largest proppant pellet. A carrier fluid having the proppant suspended therein is then pumped into the fracture. If the particles are resin coated with a curable resin, the temperature of the carrier fluid during pumping operations will be low so as to prevent premature curing of the outer resin coat. The carrier fluid bleeds off into the formation and deposits the proppant pellets in the fracture. The process is controlled by fluid loss agents which are small aggregate particles which temporarily slow the fluid loss to the formation.

After the proppant is placed, the well is shut in with pressure maintained on the formation. As the pressure within the fracture approaches the normal formation pressure, the fracture walls close in on the proppant and apply an overburden stress thereto. Deeper wells exert higher closure stress and require stronger proppants. Some curable resin coated proppants do not develop their full strength until the resin coating has cured in the formation. In the event of rapid closure of the fracture, the proppant could be crushed before the resin cures, resulting in decreased permeability.

When proppant pellets having an inner curable coating and an outer substantially cured coating are used, it is believed that the closure stress ruptures the outer coating exposing the curable inner coating. At the same time ambient formation temperature heats the inner resin coating. Initially, the resin fuses and unites at contact areas between contiguous particles or with the formation walls. As the temperature increases the polymerization reaction proceeds until the resin is cured into an insoluble and infusible crosslinked state. Grain to grain links are formed in pendular regions between adjacent particles and bond the packed particles into a permeable mass having considerable compressive strength.

It should now be apparent that various embodiments of the present invention accomplish the object of this invention. It should be appreciated that the present invention is not limited to the specific embodiments described above, but includes variations, modifications, and equivalent embodiments defined by the following claims.

What is claimed is:

1. A spherical ceramic proppant pellet comprising spent fluid cracking catalyst particles, wherein the pellet is formed by:
   a. reducing the median particle size of the catalyst;
   b. mixing the catalyst particles with water and a binder to form spherical pellets; and
   c. sintering the pellets.

2. The proppant pellet of claim 1, wherein the pellet has a Krumbein roundness and sphericity of greater than or equal to 0.9.

3. The proppant pellet of claim 1, wherein the pellet has a crush strength at 7,500 psi of less than or equal to 9.1 percent.

4. The proppant pellet of claim 1, wherein the pellet has a conductivity at least about 1650 md-ft, after 50 hours at 10,000 psi and 250° F. using 2% KCl as the flowing medium.

5. The proppant pellet of claim 1, wherein the spent fluid cracking catalyst comprises from about 25 to about 80 weight percent silica, and from about 20 to about 75 weight percent alumina.

6. The proppant pellet of claim 1, wherein the pellet comprises silica and alumina in a weight ratio of about 2:1 to about 1:1.

7. The proppant pellet of claim 1, wherein the pellet comprises silica and alumina in a weight ratio of about 1:1.

8. The proppant pellet of claim 1, wherein the spent fluid cracking catalyst comprises a zeolite.

9. The proppant pellet of claim 1, wherein the density of the pellets after sintering is from about 2 g/cm$^3$ to about 2.7 g/cm$^3$.

10. The proppant pellet of claim 1, wherein the pellet is coated with at least one resin.

11. A method for preparing a spherical ceramic proppant pellet, the method comprising:
   a. providing spent fluid cracking catalyst particles;
   b. reducing the particle size of the catalyst particles;
   c. mixing the catalyst particles with water and a binder to form spherical pellets; and
   d. sintering the pellets.

12. The method of claim 11, wherein said reducing the particle size of the catalyst particles comprises reducing the mean particle size of the particles to from about 4 to about 6 microns.

13. The method of claim 11, wherein the binder is one of polyvinyl acetate, methyl cellulose, and polymethylmethacrylate.

14. The method of claim 11, wherein said sintering comprises heating the pellets at a temperature of between about 1,300° C. to about 1,500° C.

15. The method of claim 11, wherein the method further comprises coating the pellets with at least one resin after sintering.

16. The method of claim 15, wherein said coating comprises coating the pellet with an inner coating of a fusible, curable resin and an outer coating of a substantially cured resin.

17. The method of claim 15, wherein said coating comprises coating the pellet with a substantially cured inner resin coating, an outer resin coating, wherein the outer resin coating may be cured or curable, and optionally a reinforcing agent.

18. The method of claim 11, wherein the spent fluid cracking catalyst particles comprise a zeolite.

19. The method of claim 11, further comprising screening the pellets to a mean particle size of 20/40 mesh.

20. A proppant pellet composition comprising pelletized and calcined spent fluid cracking catalyst, wherein the spent fluid cracking catalyst comprises from about 25 to about 80 weight percent silica, and from about 20 to about 75 weight percent alumina.

21. The proppant pellet composition of claim 20, wherein the silica and alumina are present in a weight ratio of silica/alumina of from about 2:1 to about 1:1.

22. The proppant pellet composition of claim 20, wherein the silica and alumina are present in a weight ratio of silica/alumina of about 1:1.

23. The proppant pellet composition of claim 20, wherein the density of the pellet composition after sintering is from about 2 g/cm$^3$ to about 2.7 g/cm$^3$.

24. The proppant pellet composition of claim 20, wherein the mean particle size of the pellet composition is about 20/40 mesh.

25. The proppant pellet composition of claim 20, wherein the spent fluid cracking catalyst optionally further comprises at least one of:
   up to about 1000 parts per million copper;
   up to about 7000 parts per million vanadium;
   up to about 200 parts per million lead;
   up to about 7000 parts per million nickel;
   up to about 2500 parts per million antimony;
   up to about 2 weight percent iron;
   up to about 1.5 weight percent sodium; and,
   detectable amounts of at least one component selected from the group consisting of platinum, rhenium, sulfur compounds, and rare earth metals.

26. The proppant pellet composition of claim 20, wherein the composition further comprises at least one resin coating.

27. The proppant pellet composition of claim 25, wherein the resin coating comprises an inner coating of a substantially cured resin, an outer coating of resin, and optionally a reinforcing agent interspersed at the inner coating/outer coating boundary.

28. The proppant pellet composition of claim 25, wherein the resin coating comprises an inner coating of a fusible curable resin and an outer coating of a substantially heat-cured resin, wherein the resin of the outer coating is heat-curable at conditions that leave the resin of the inner coating uncured.

29. The proppant pellet composition of claims 27 or 28, wherein
   the resin of the inner coating is at least one resin independently selected from the group consisting of phenol-aldehyde resins, urea-aldehyde resins, melamine-aldehyde resins, epoxy resins, furfuryl alcohol resins, and copolymers of such resins; and wherein the resin of the outer coating is at least one resin independently selected from the group consisting of phenol-aldehyde resins, urea-aldehyde resins, melamine-aldehyde resins, epoxy resins, furfuryl alcohol resins, and copolymers of such resins.

30. A method of propping a fracture in a subterranean formation comprising creating a fracture in said subterranean formation, and placing in said fracture a quantity of the proppant pellets set forth in any one of claims 1–10 or 20–28.

* * * * *